United States Patent [19]
Yoshida

[11] Patent Number: 6,151,302
[45] Date of Patent: *Nov. 21, 2000

[54] CELL FLOW RATE CONTROL METHOD FOR ASYNCHRONOUS TRANSFER MODE SWITCH

[75] Inventor: Kazuhiro Yoshida, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/851,008

[22] Filed: May 5, 1997

[30] Foreign Application Priority Data

Oct. 4, 1996 [JP] Japan ..................................... 8-264381

[51] Int. Cl.$^7$ .................................................. H04L 12/56
[52] U.S. Cl. ........................................... 370/233; 370/395
[58] Field of Search ..................................... 370/230, 231, 370/232, 233, 395, 396, 397, 399, 409, 351, 352, 241, 411, 229, 234, 235; 340/825.5, 825.51, 825.52, 825.01, 825.03

[56] References Cited

U.S. PATENT DOCUMENTS

| | | | |
|---|---|---|---|
| 5,267,232 | 11/1993 | Katsube et al. | 370/230 |
| 5,295,135 | 3/1994 | Kammerl | 370/233 |
| 5,524,006 | 6/1996 | Hluchyj et al. | 370/233 |
| 5,568,468 | 10/1996 | Ogasawara et al. | 370/230 |
| 5,825,653 | 10/1998 | Goss | 370/230 |

OTHER PUBLICATIONS

Asyncronous Transfer Mode; Solution for Broadband ISDN Martin de Prycker; 1993.

*Primary Examiner*—Dang Ton
*Attorney, Agent, or Firm*—Helfgott & Karas, PC.

[57] ABSTRACT

A cell flow rate control method for an ATM switch can cope with various UPC forms while using the same hardware arrangement. The cell flow rate control method includes the steps of preparing a conformance condition table in which are stored conformance conditions for each connection determined for each cell loss priority in an ATM cell; and employing, for each cell loss priority, a plurality of conformance test components in accordance with the conformance condition stored in the conformance condition table.

16 Claims, 11 Drawing Sheets

GFC: generic flow control
VPI: virtual path identifier
VCI: virtual channel identifier
PTI: payload type identifier
CLP: cell loss priority

CELL FLOW RATE CONTROL METHOD FOR ASYNCHRONOUS TRANSFER MODE SWITCH

BACKGROUND OF THE INVENTION

1. Field of the Invention

The present invention relates to a method for monitoring and controlling an appropriate cell flow rate for an ATM (Asynchronous Transfer Mode) switch.

2. Related Arts

An ATM switch receives a cell in a format consisting of a 5-byte header and a 48-byte payload, as is shown in FIG. 9, and selects and outputs a path in the ATM switch, based on a virtual channel identifier (VCI).

As is shown in FIG. 10, such an ATM switch 1 is connected via a transfer channel to users 31 through 3n by a UNI (User-Network Interface), or is connected to another ATM switch 11, which is connected to a user 50 via a transfer channel by an NNI (Network-Node Interface).

In FIG. 10, an ATM switch 1 has input interface circuits 21 through 2n, an ATM switch unit 10 and an output interface circuit (not shown).

The input interface circuits 21 through 2n each include a transfer channel end section 210, for receiving a cell across the transfer channel; a cell flow rate monitor section (UPC: Usage Parameter Control) 211; a performance monitor section (OAM: Operations, and Maintenance) 212; and a header converter (HCV) 213, for converting a VCI that is employed for the input transfer channel into a VCI that is employed for the ATM switch 1 and an output transfer channel.

In order to increase the efficiency of the cell processing by the ATM switch, a cell transmission rate is set and declared in advance between a network manager and a subscriber before the operation. Cells are output by the subscriber at the declared transmission rate.

However, sometimes the transmission rate fluctuates, depending on the time period, and the cells are transmitted at a transmission rate different from the declared transmission rate. Therefore, the UPC 211 monitors the traffic from the subscriber, i.e., the flow rate for the cells that are transmitted. When the flow rate exceeds the cell transmission rate that was set in advance, the UPC 211 performs conformance.

The OAM 212 monitors the occurrence of failure in a network and the performance. When an abnormality is detected, the OAM 212 makes a detour in route, switching the line to a protection line, etc. The detection of failure and the monitoring of the performance is performed by monitoring an OAM (Operations, and Maintenance) cell that is transmitted together with a normal cell.

In FIGS. 11 through 13 are shown flow charts of processing, which is specified by the advisory or the committee, for performing different conformance test components by using a CLP (Cell Loss Priority) value.

The CLP (Cell Loss Priority) value of a cell is indicated by one bit that is present in the header portion of the format shown in FIG. 9. Therefore, the CLP value is "1" or "0." A CLP value of "1" indicates that, when a traffic congestion occurs, the cell has the highest abandonment priority.

The control of the UPC 211 relative to the CLP value is designated by the ITU-T advisory, etc. In FIGS. 11 and 12 are examples described in ITU-T advisory FIG. 8/I.371; FIG. 11 is an example with no tagging option, and FIG. 12 is an example with a tagging option. The tagging is the control to input a cell without abandoned to the ATM switch 1, and set the CLP value as CLP=1 which means the cell may be abandoned, if necessary due to congestion.

In FIG. 11, the processing for an input cell branches depending on its CLP value (step S01). When CLP=0, processing for a test component $C_0$ is performed (step S02), and after summing processing is emerged (step S03), processing for a test component $C_{0+1}$ is performed (step S04). When CLP=1, only the processing for the test component $C_{0+1}$ is performed.

For the conformance test, cells are abandoned as needed. Then, a parameter for a pertinent conformance component for updated (step S05). In FIG. 11, the parameter of the conformance test CLP=0+1 (step S05) are updated.

In FIG. 12 is shown a conformance test having a tagging option. When the result of the processing for test component $C_0$ (step S02) is non-conformance, the processing is changed with CLP=1 (step S06).

In FIG. 13 is shown an example described in FIG. II-1 of the ATM Forum Technical Committee Report. This is the connection for which only CLP=0 is used, and two conformance tests, $T_0$ (test for PCR: Peak Cell Rate) and $T_{s0}$ (test for SCR: Sustainable Cell Rate), are performed.

In this connection, either the cell with CLP=1 is abandoned, or some conformance test is performed for that cell. The conformance test in this case can currently have six or more different patterns, such as the leaky bucket algorithm and the virtual scheduling algorithm.

When a large number of cells are temporarily transmitted at a rate exceeding that declared by a subscriber and causes a traffic congestion, these cells overflow from a bucket. According to the leaky bucket algorithm, the traffic is monitored using the depth of a bucket that leaks a predetermined amount, and the cells that overflow the bucket are regarded as illegal cells.

More specifically, according to the leaky bucket algorithm, a counter is used as a bucket. When a cell is received, the counter increments a value, and counts down in a constant period, so that the bursting of cells and the average cell flow rate are monitored.

Since a plurality of types of conformance tests are set for each connection in accordance with the example represented by the advisory or the committee report, various conformation tests must be performed using the same interface.

When the processing in FIGS. 11 through 13 described in the advisory is built using the same architecture, it will be very complicated.

When these conformance tests are to be performed by switching modes, the tests will be less flexible because there may still be an alteration and an addition to the advisory.

SUMMARY OF THE INVENTION

It is, therefore, one object of the present invention to provide a cell flow rate control method for an ATM switch that can cope with various UPC forms while using the same hardware arrangement.

To achieve the above object, according to the present invention, a cell flow rate control method, for an ATM switching device, whereby conformance with a cell flow is performed based on a cell loss priority (CLP) of an asynchronously transfer mode (ATM) cell, may include the steps of:

preparing a conformance condition table in which are stored conformance conditions for each connection determined for each cell loss priority in an ATM cell; and employing, for each cell loss priority, a plurality of conformance test components in accordance with the conformance condition stored in the conformance condition table.

Further, objects and features of the present invention will be clear from the following detailed description of the embodiment according to the present invention.

DETAILED DESCRIPTION OF THE PREFERRED EMBODIMENTS

Figure 1:
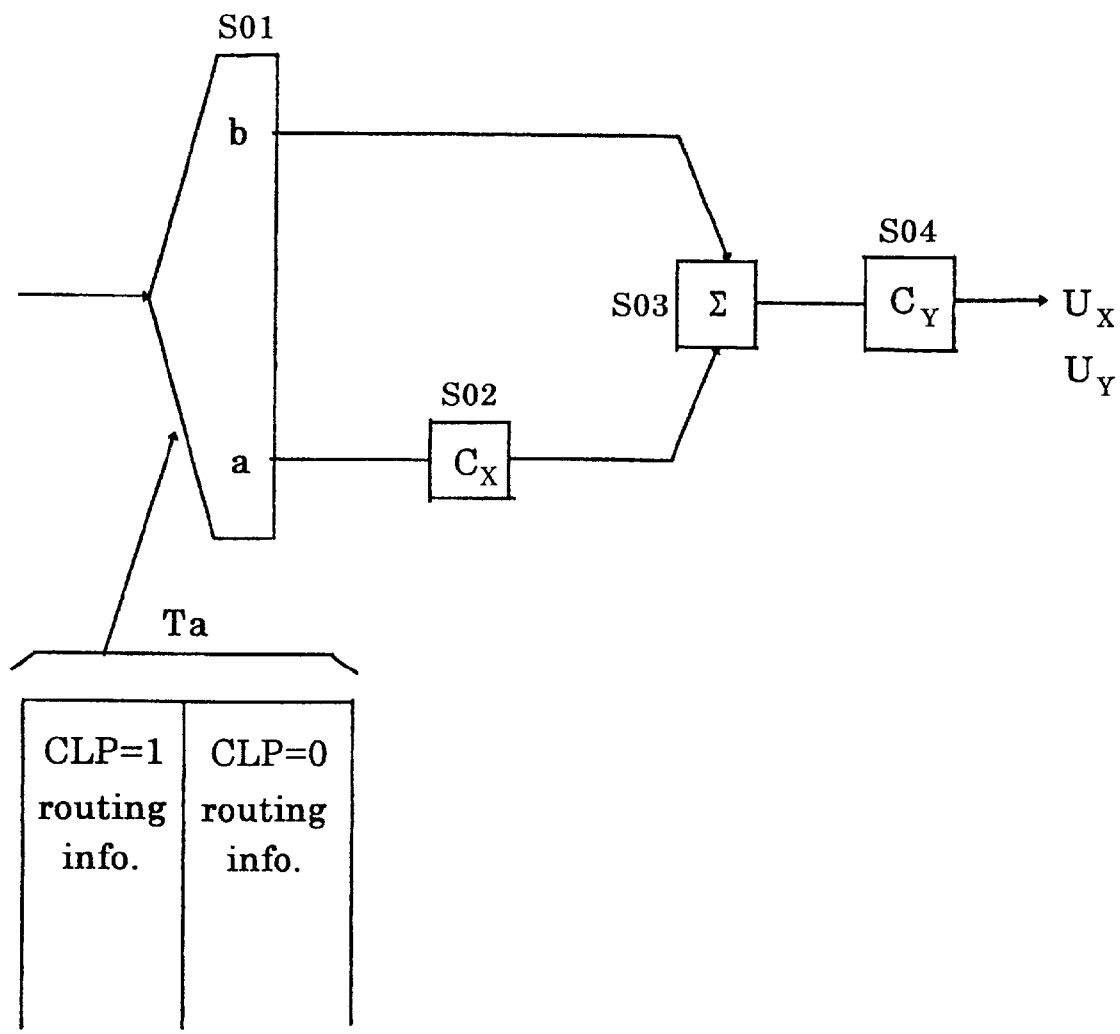
FIG. 1 is a diagram illustrating a first embodiment of the present invention with no tagging.

The preferred embodiments of the present invention will now be described while referring to the accompanying drawings. The same reference numerals are used throughout to denote corresponding or identical components in the drawings.

Figure 11:
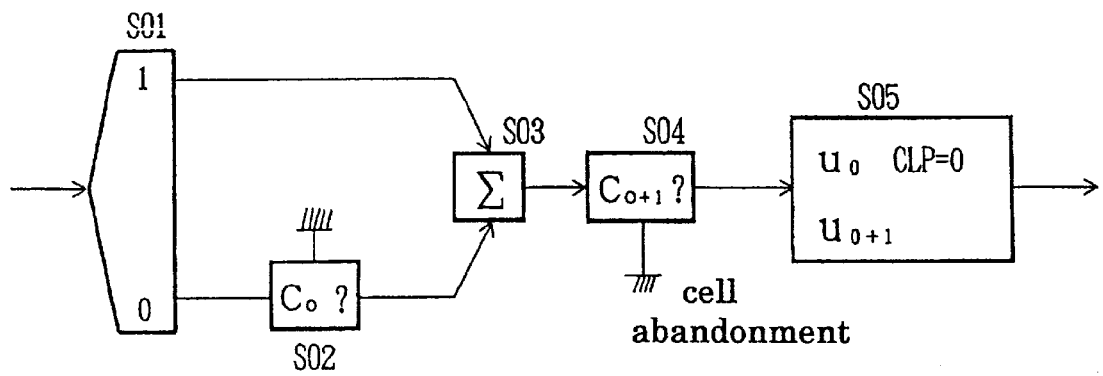
FIG. 11 is a flowchart for example processing shown in the ITU-T advisory, FIG. 8/I.371, for using conformation test components with no tagging.
Figure 12:
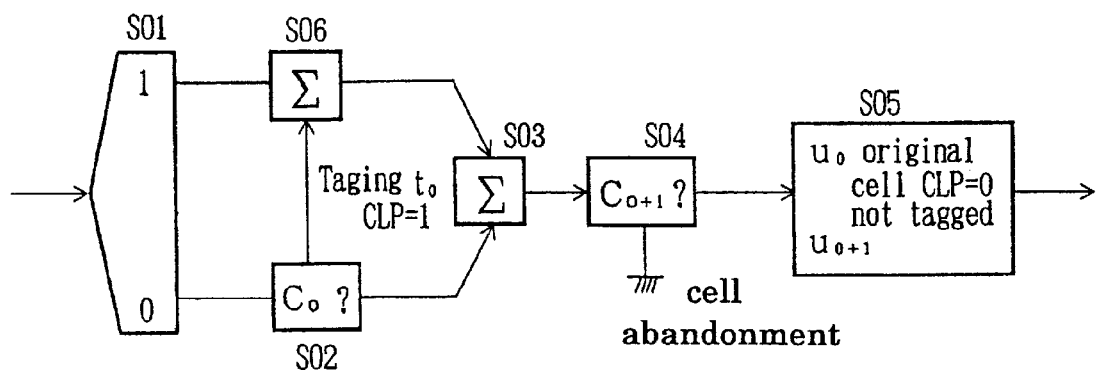
FIG. 12 is a flowchart for example processing shown in the ITU-T advisory, FIG. 8/I.371, for using conformation test components with tagging.

FIG. 1 is a diagram showing a first embodiment of the present invention, which corresponds to FIGS. 11 and 12. In the examples in FIGS. 11 and 12, test components $C_0$ and $C_{0+1}$ are processed for a cell for which CLP=0, and only test component $C_{0+1}$ is processed for a cell for which CLP=1.

On the other hand, in the first embodiment in FIG. 1, for each connection, provided as a data table $T_a$ are a test component that should be processed for a cell for which CLP=0, and a test component that should be processed for a cell for which CLP=1 or that should be processed for a cell when tagging is performed. More specifically, in the table $T_a$ are stored routing information (steps S01 through S04) for each connection relative to cells for which CLP=1 and CLP=0.

To perform the same processing as in FIG. 11, for a cell for which CLP=0, a route a for processing test components $C_X$ (step S02) and $C_Y$ (step S04) in FIG. 1 is selected by a branch function (step S01). For a cell for which CLP=1, route b for processing only test component $C_Y$ (step S04) is selected. The routing information that is used to select the routes a and b is prepared in the data table $T_a$.

Figure 13:
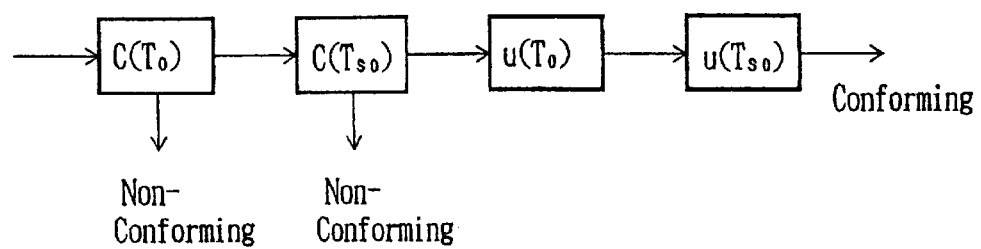
FIG. 13 is a diagram illustrating an example, shown in the ATM Forum Technical Committee, FIG. II-1, for using conformance test components.

To perform the processing shown in FIG. 13, route a is selected in accordance with both the routing information for CLP=0 and the routing information for CLP=1. In the example in FIG. 13, since the processing for a cell for which CLP=1 is not defined, a cell for which CLP=1 can be processed in the same manner as is a cell for which CLP=0. The tagging process is not shown in FIG. 1.

When from among the above plurality of conformance tests the leaky bucket algorithm and the virtual scheduling algorithm are employed, these algorithms can not be set to determine that all of the cells received are non-conformance cells.

When the first embodiment in FIG. 1 corresponds to FIG. 13 and when a cell for which CLP=1 flows in, a cell for which CLP=1 that is not to be used is passed through. In a second embodiment, in addition to the arrangement in the first embodiment, information indicating non-conformance is included in the routing information for each CLP, which is stored in the data table $T_a$.

The second embodiment will be explained while referring to FIG. 2. In the first embodiment in FIG. 1, unlike the example in FIG. 13, the same process is performed for a cell for which CLP=1 and a cell for which CLP=0. In the second embodiment, the processing route for CLP=1 is defined as route c. At branch function (step S01), the cell is always determined as non-conformance, and an abandonment process is performed. The data indicating that the processing route for CLP=1 is defined as route c is stored in the data table $T_a$.

Not only can non-conformance be selected for the routine information for CLP=1, but also for the routine information for CLP=0. Together with the tagging option, the process for changing all the cells to CLP=1 can be performed.

Figure 2:
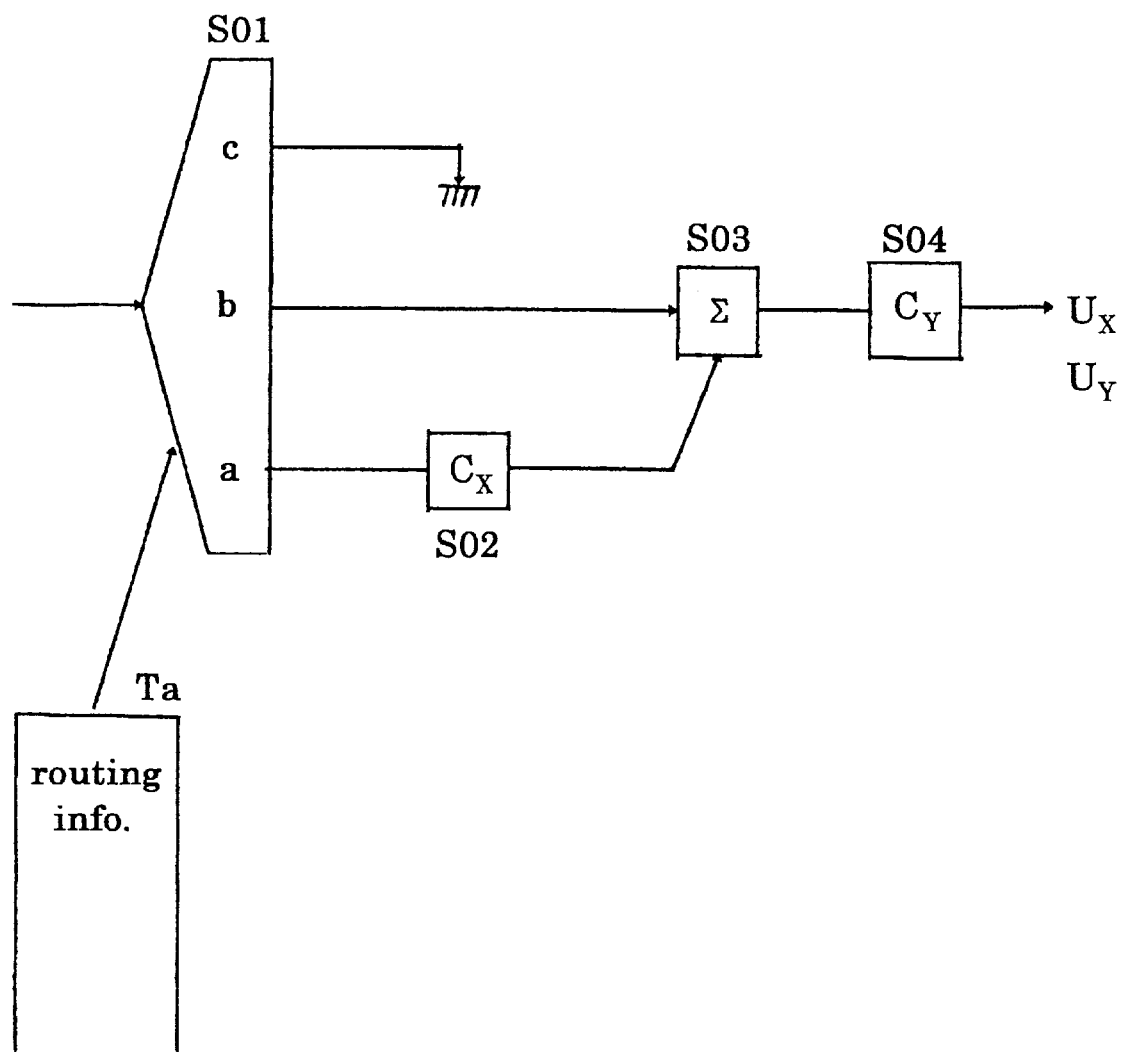
FIG. 2 is a diagram illustrating a second embodiment of the present invention with tagging.
Figure 3:
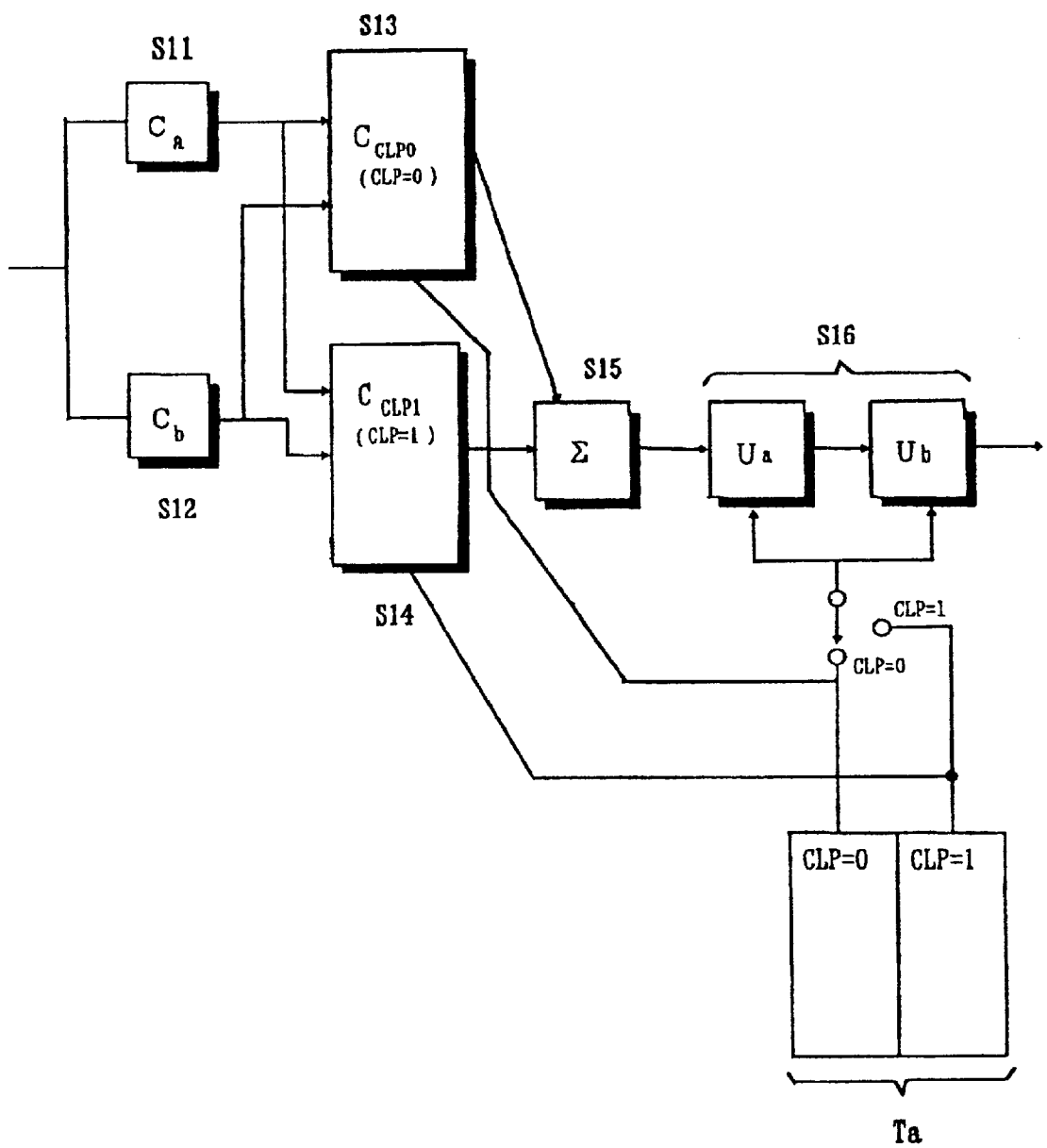
FIG. 3 is a diagram illustrating a third embodiment to effectively operate the first and the second embodiments.

To more efficiently carry out the first and the second embodiments, the arrangement in FIG. 3 can be provided as a third embodiment. In FIGS. 1 and 2, the tagging process is not described. If the tagging option is performed with the arrangement in FIG. 1 or 2, when the test component $C_X$ (step S02) in FIGS. 1 and 2 is judged non-conformance, CLP is changed to 1 and the process returns to the branch function (step S01) to perform the tagging.

In the embodiments in FIGS. 1 and 2, a combination of test components that are to be processed must be determined in advance. Therefore, these arrangements are not flexible enough to cope with changes to the Advisory that may be issued in the future.

In FIG. 3 is shown the embodiment that takes that point into account. Regardless of the CLP value, the test components $C_a$ and $C_b$ are processed (steps S11 and S12). For the conformation determination when a CLP=0, a first determination $C_{CLP0}$ is performed (step S13), and for the conformation determination when a CLP=1, a second determination $C_{CLP1}$ is performed (step S14).

The first determination $C_{CLP0}$ (step S13) and the second determination $C_{CLP1}$ (step S14) are provided by referring to the routing information in which CLP=0 and the routing information in which CLP=1, which are stored in the table $T_a$, and a CLP value. In other words, the routing information in which CLP=0 and the routing information in which CLP=1 provide conformation determination conditions at the first determination $C_{CLP0}$ (step S13) and the second determination $C_{CLP1}$ (step S14).

Although the test components $C_a$ and $C_b$ (steps S11 and S12) are processed regardless of the CLP value, the CLP value is output at the first determination $C_{CLP0}$ (step S13) only when a cell for which CLP=0 is determined to be a conforming cell. Similarly, the CLP value is output at the second determination $C_{CLP1}$ (step S14) only when a cell for which CLP=1 is determined to be a conformance cell. Further, a cell for which CLP=1 and that is determined to be a conformance cell can be a conformance cell that is obtained by tagging.

The output at the first determination $C_{CLP0}$ (step S13) and the second determination $C_{CLP1}$ (step S14) are synthesized. In the succeeding updating processes $U_a$ and $U_b$ (step S16), whether or not a parameter updating process is required is determined in accordance with the routing information that is consonant with the conformance CLP value.

The test components, such as $C_a$ and $C_b$, are not limited to two and may be three or more.

The ATM switch also has a process for an OAM cell for the purpose of performing maintenance, etc. Since, as is described above, the OAM cell has a special purpose, such as the monitoring of a state, it is sometimes preferable that an independent conformance test be performed. One to three kinds of conformance components are required for a normal cell.

In a fourth embodiment, two types of conformance tests are provided while an OAM cell and a normal cell are used as aggregate UPCs. With the same arrangement, one type of conformance test is provided for a subscriber cell and another type of independent conformance test is provided for an $C_{OAM}$ cell.

Figure 4:
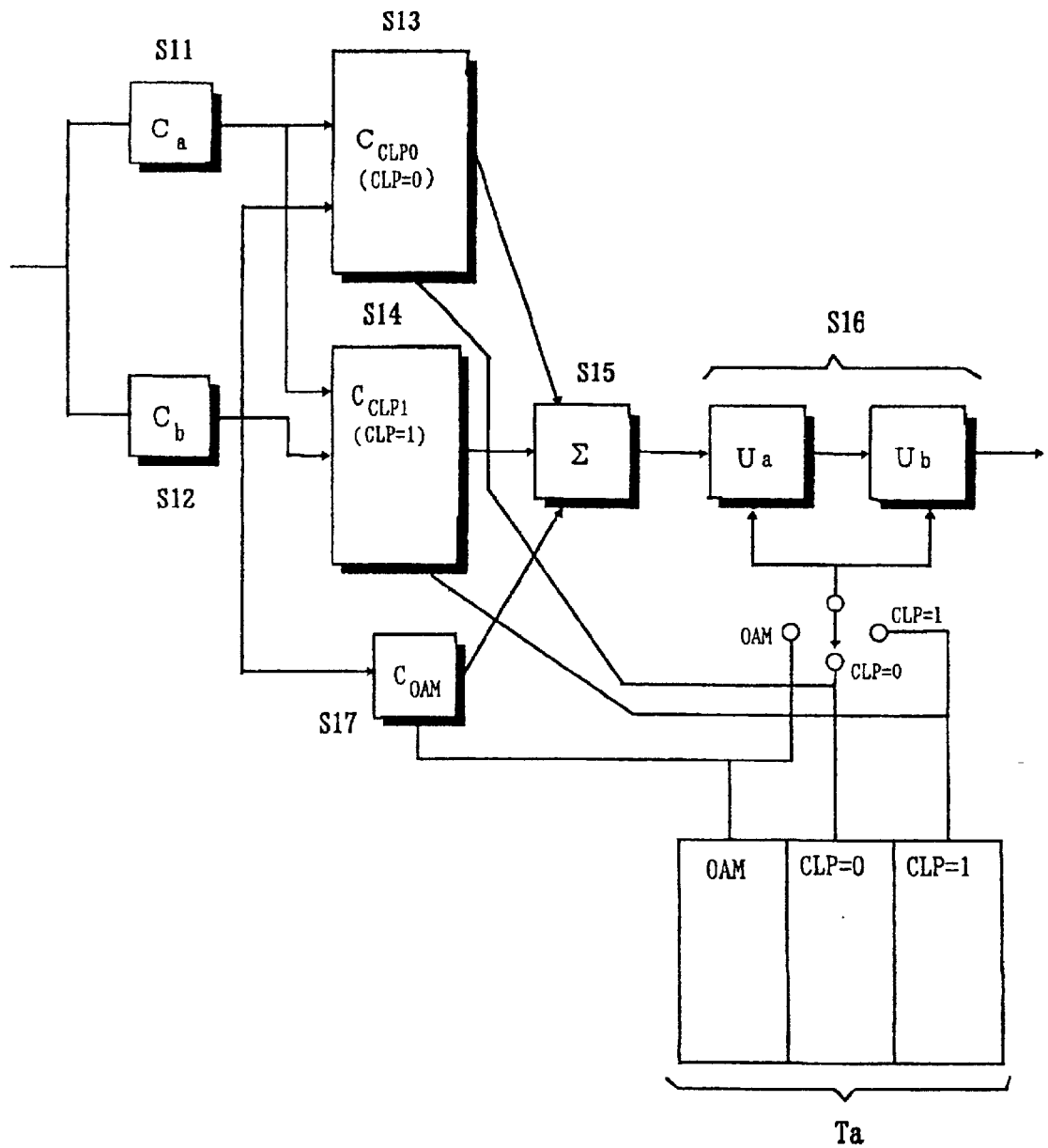
FIG. 4 is a diagram illustrating a fourth embodiment where two types of conformance tests are provided while an OAM cell and a normal cell are employed as an aggregate UPC.

The basic structure for the processing in FIG. 4 is the same as that for the processing in FIG. 3, except that an independent cooperation discriminator $C_{OAM}$ (step S17) relative to an OAM cell is provided and that the OAM routing information is provided from the table $T_a$.

The independent cooperation discriminator $C_{OAM}$ (step S17) determines whether or not conformance is attained only when an input cell is an OAM cell and when the result of the conformance test $C_b$ (step S12) is that conformance is attained. When the input is an OAM cell, $C_{CLP0}$ and $C_{CLP1}$ (steps S13 and S14) perform no conformance determinations, regardless of the results obtained by the conformance tests $C_a$ and $C_b$ (steps S12 and S13).

The conformance test $C_b$ (step S12) can be used for OAM separation policing (monitoring a cell flow rate), and can also be used as a test component for a normal cell. When OAM separation policing is required for a specific connection, the conformance test $C_b$ (step S12) can be assigned for the OAM. For another connection in which OAM aggregation policing is performed, the conformance test $C_b$ (step S12) can be used as one of the test components.

Figure 5:
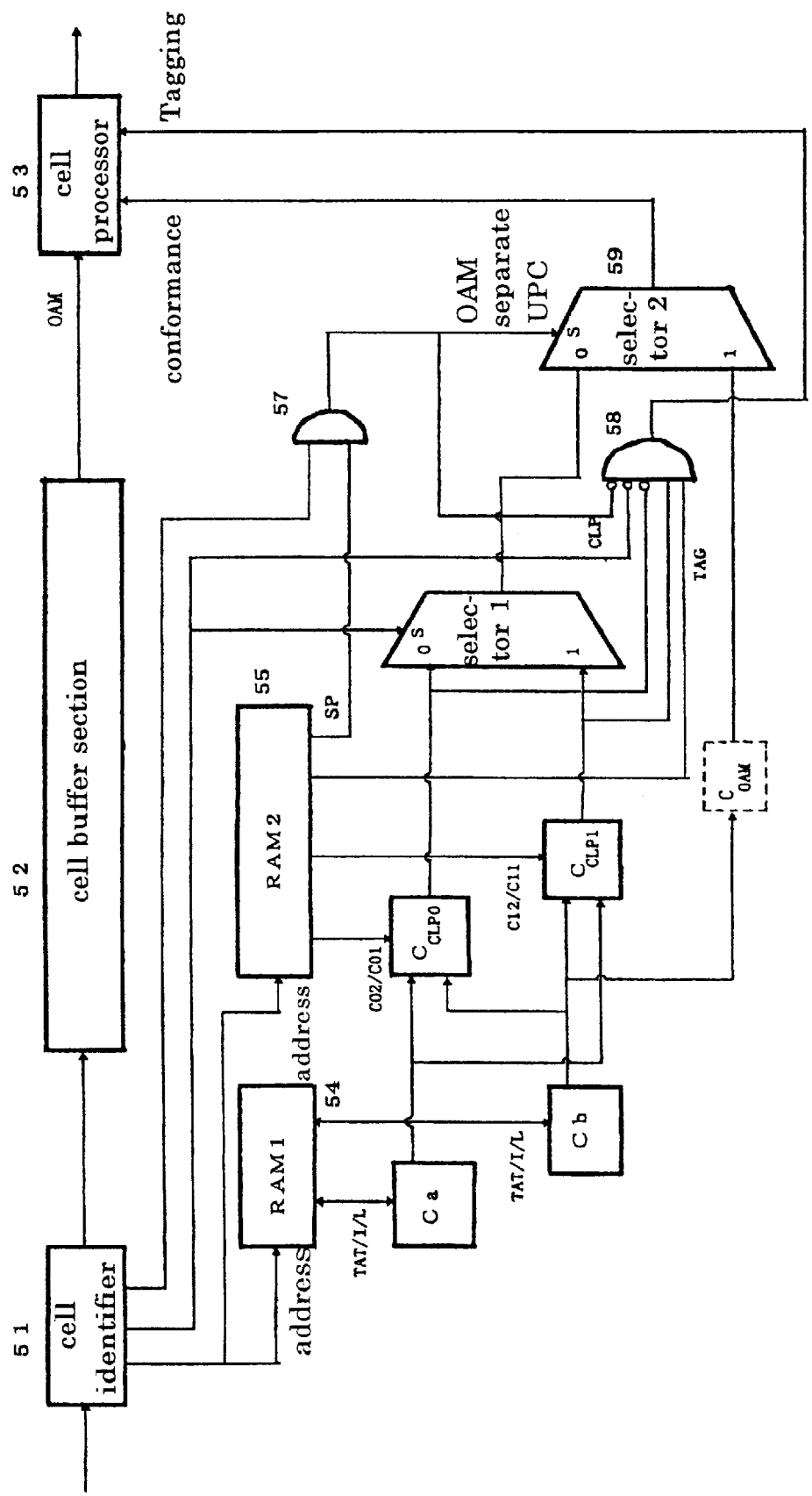
FIG. 5 is a block diagram for the arrangement in the embodiments of the present invention.

FIG. 5 is a block diagram illustrating the structure employed for the above described embodiments. In the structure in FIG. 5, a cell is identified, and after a conformance test is conducted, a cell process is performed. Although updating of a parameter is required when the result of the test is that conformance is attained, a section that can handle this process is not shown in FIG. 5.

Figure 9:
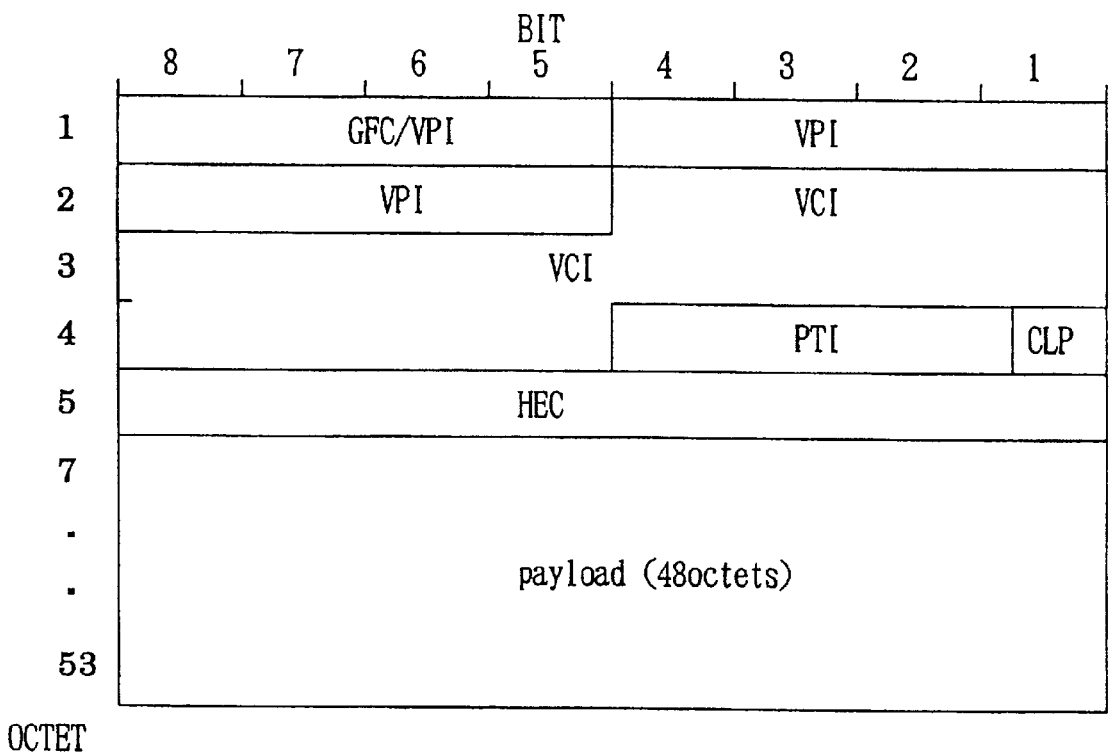
FIG. 9 is a diagram for explaining an ATM cell format.
Figure 10:
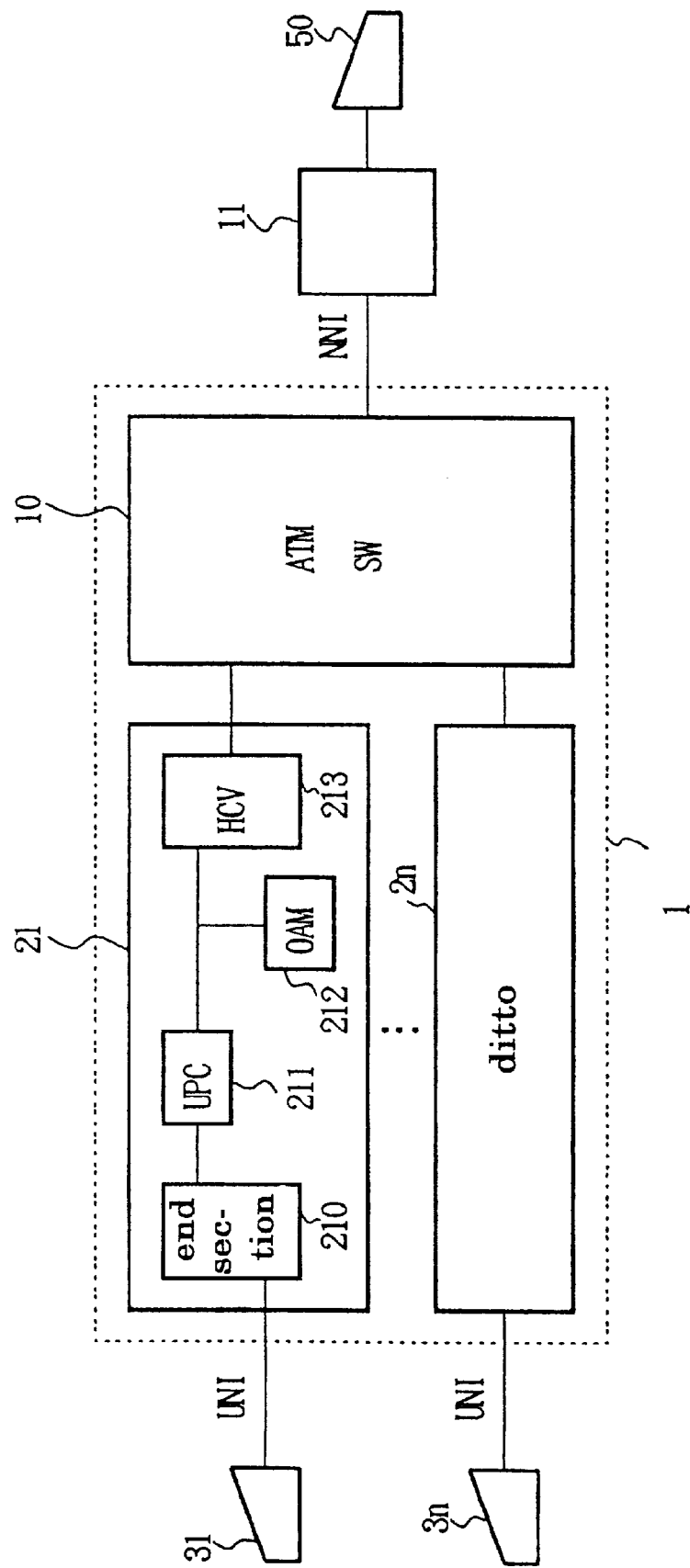
FIG. 10 is a block diagram illustrating an example arrangement for an ATM switching device.

A cell identifier 51 receives an ATM cell, and refers to the VPI, VCI and PTI of the cell (see FIG. 9) to identify to which connection data the cell belongs. Further, the cell identifier 51 refers to the PTI and the CLP of the cell to identify the attributes of the cell (OAM cell, cell loss priority, etc.).

The cell identifier 51 transmits a RAM address corresponding to a pertinent connection to a first RAM 54 and a second RAM 55. From the first RAM 54, a UPC parameter is transmitted to conformance test circuits $C_a$ and $C_b$.

There are three UPC parameters for the virtual scheduling algorithm: TAT, I and L. TAT denotes a Theoretical Arrival Time, and I is a cycle T of a peak cell flow rate (cell rate=1/T) that is contracted for by a subscriber. L denotes a tolerance (a fluctuation error).

Figure 6:
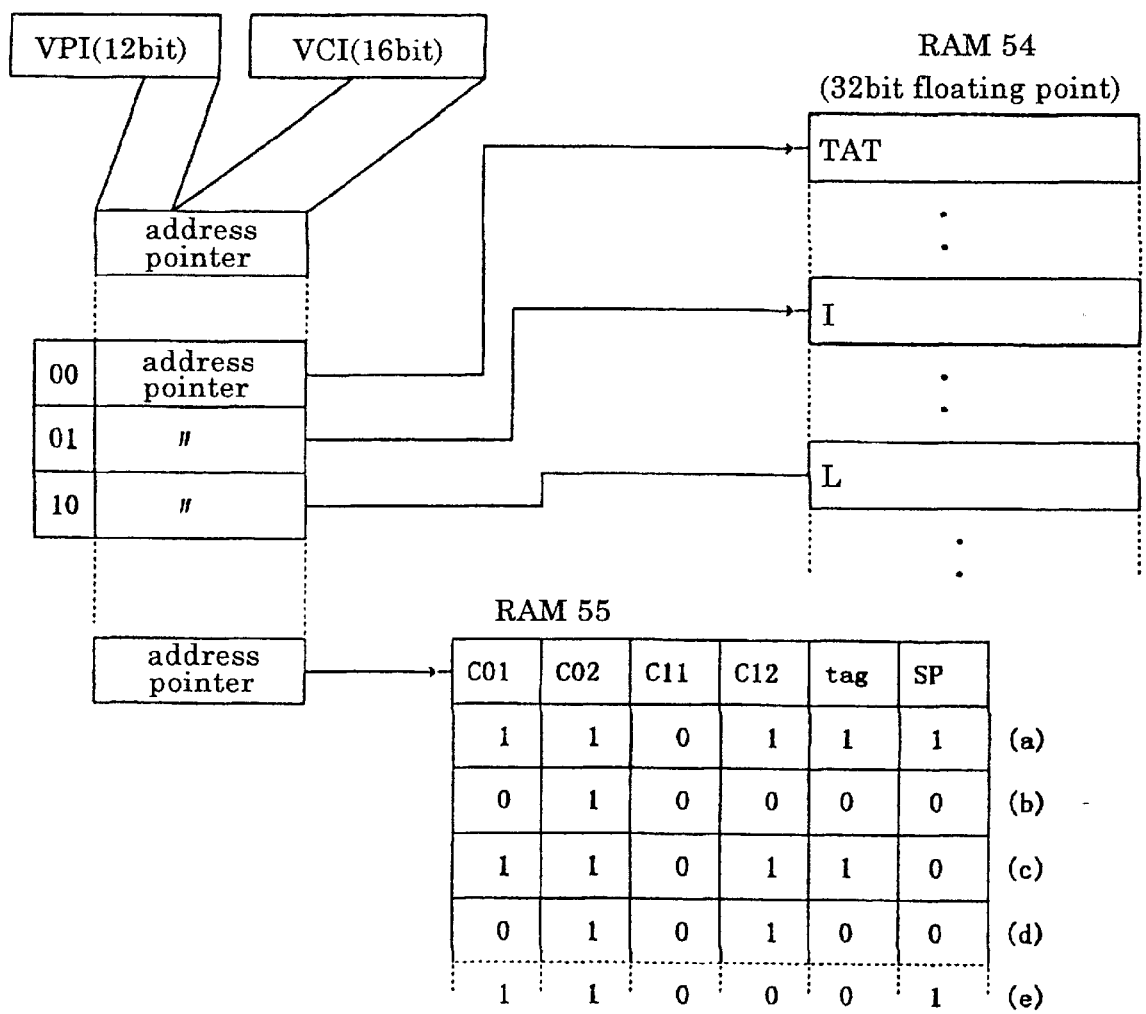
FIG. 6 is a diagram for explaining what data is stored in first and second RAMs in FIG. 5.

In FIG. 6 are shown example contents in the first RAM 54 and the second RAM 55 when the virtual scheduling algorithm is employed. In the first RAM 54 are stored the TAT, I and L parameters. For these parameters, a combination of 00, 01 or 10 and an address pointer, which consists of a 12-bit VPI and a 16-bit VCI, serves as a read address for the first RAM 54.

In the second RAM 55 are stored, for each connection, determination references (C01, C02, C11 and C12), which correspond to routing information that is read at an address pointer consisting of the VPI and the VCI, a tagging tag, and a separation UPC (SP) for an OAM cell. For example, (a) through (e) are stored in the RAM 55.

The tagging tag and the separation UPC (SP) of the OAM cell are set independently based on the determination references (C01, C02, C11 and C12).

A detailed explanation will now be given for the determination references (C01, C02, C11 and C12) that are set as examples in the second RAM 55 in FIG. 6.

The TAT, I and L parameters are read from the first RAM 54 and input to the conformance test circuits $C_a$ and $C_b$. The results of the calculation obtained there are transmitted to the cooperation discriminators $C_{CLP0}$ and $C_{CLP1}$, and the determination for each CLP value is acquired.

Figure 7:
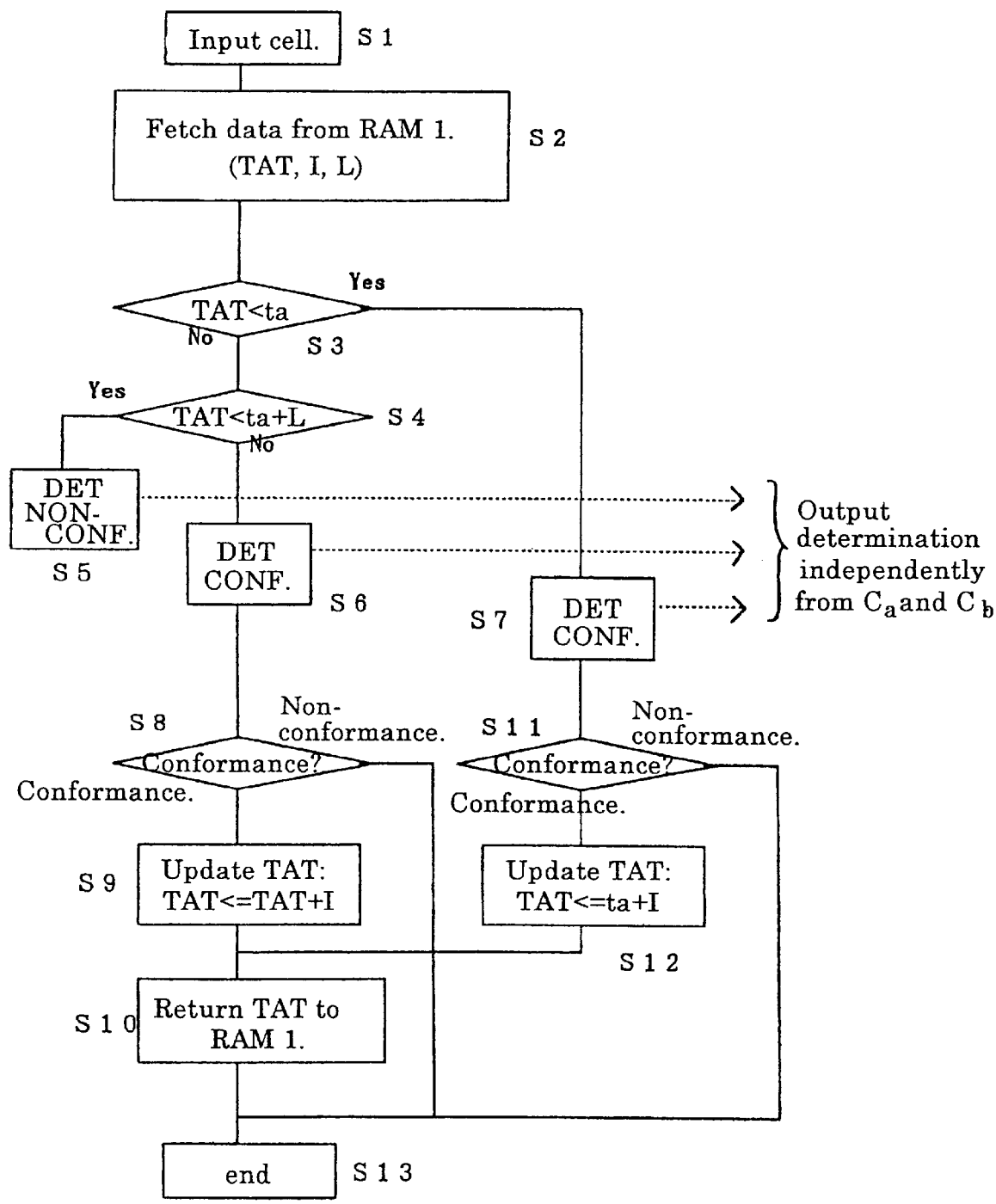
FIG. 7 is a flowchart showing a process algorithm for conformance test circuits $C_a$ and $C_b$ in FIG. 5.

FIG. 7 is a flowchart showing an algorithm for the calculations performed by the conformance test circuits $C_a$ and $C_b$. When a cell is input by the cell identifier 51 in FIG. 5 (step S1), corresponding TAT, I and L data sets are read at the addresses pointed to by the address pointers for which are used the VPI and the VCI, as previously described (step S2).

A TAT (Theoretical Arrival Time) that is read is compared with a current time ta (steps S3 and S4). When as the result of the comparison the TAT indicates a past event (TAT<ta or TAT≦ta+L), temporary non-conformance is ascertained, and "1" is output (steps S6 and S7).

Following this, when as the result of cooperation determination conformance is ascertained, which will be described later (steps S8 and S9), or when conformance by tagging is ascertained, a TAT change process is performed (step S9 or S12). In the TAT change process, the TAT in the first RAM 54 is rewritten to [TAT+I] (step S9) or [ta+I] (step S12).

In FIG. 5, the cooperation discriminators $C_{CLP0}$ and $C_{CPL1}$ receive the determination references (C01, C02, C11 and C12), which serve as routing information, from the second RAM 55, and determine whether there is conformance by comparing the results received from the conformance test circuits $C_a$ and $C_b$ with the determination references.

The determination references (C02, C01, C12 and C11) that are stored as a routing (determination reference) information table in the second RAM 55 are defined as is shown in Table 1, for example. The determination references that are provided correspond to combinations of C02 (C12) and C01 (C11).

(C12) and (C11) are written in parentheses in Table 1 because the cooperation discriminators $C_{CLP0}$ and $C_{CLP1}$ have the same structure.

TABLE 1

| C02 (C12) | C01 (C11) | |
|---|---|---|
| 0 | 0 | Non-conformance relative to CLP value |
| 0 | 1 | Determined only from result from $C_a$ |
| 1 | 0 | Determined only from result from $C_b$ |
| 1 | 1 | Determined Conformance relative to $C_a$ and $C_b$ |

The results of determinations obtained by the cooperation discriminators $C_{CLP0}$ and $C_{CLP1}$ are selected in consonance with the CLP value of an input cell. When conformance of the cell should be performed by tagging, i.e., when the tagging option flag tag=1 in the second RAM 55, and when the cell is regarded as non-conformance with CLP=0 and the cell is regarded as conformance with CL0=1, an AND gate 58 outputs a tagging signal.

Figure 8:
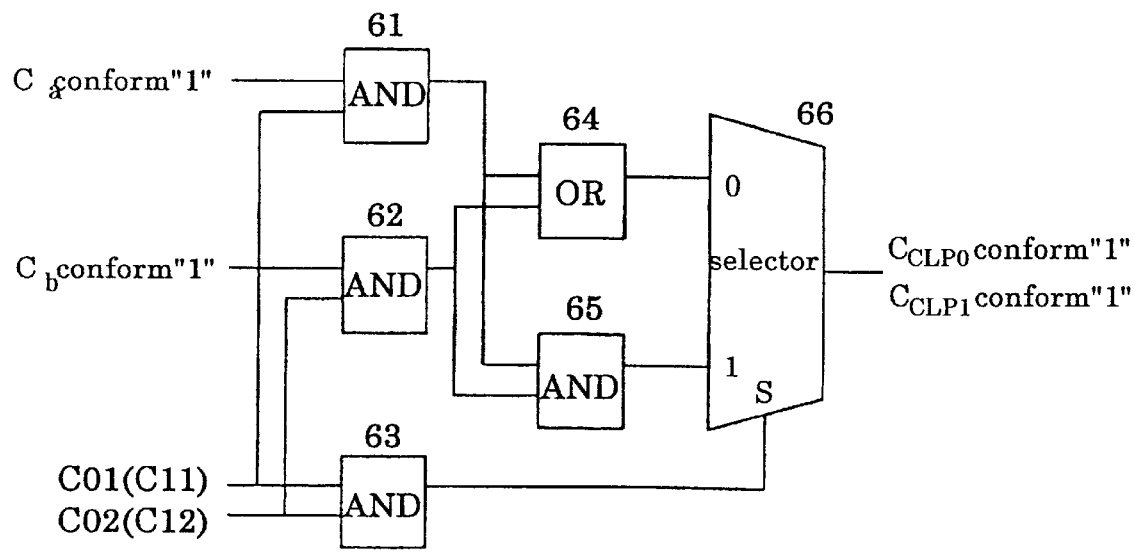
FIG. 8 is a block diagram illustrating an example arrangement for cooperation discriminators $C_{CLP0}$ and $C_{CLP1}$ in FIG. 5.

One example arrangement of the cooperation discriminator $C_{CLP0}$ or $C_{CLP1}$ is shown in FIG. 8. The cooperation discriminators $C_{CLP0}$ and $C_{CLP1}$ have the same structure. With this structure, the operation will now be described while referring to the definitions in Table 1. In accordance with the definition in Table 1, when (C02, C01)=(0, 0), the cooperation discriminator as $C_{CLP0}$ determines the flow of cells for which CLP=0 to be non-conformance cells.

In FIG. 8, a temporary conformance output "1" is transmitted by each of the conformance test circuits $C_a$ and $C_b$ to the respective AND gates 61 and 62. However, since "0" is input at the other terminals of the AND gates 62 and 62, the outputs of the conformance test circuits $C_a$ and $C_b$ are masked, so that the cooperation discriminator $C_{CLP0}$ does not output a conformance "1" and determines that the result for the CLP value is a non-conformance "0."

When (C02, C01)=(0, 1) or when (C02, C01)=(1, 0), one of the outputs of the conformance test circuits $C_a$ and $C_a$ is transmitted in consonance with the definition in Table 1. That is, only the result of the conformance test circuit $C_a$ or $C_b$ is employed for the determination.

When (C02, C01)=(1, 1), the outputs of both the conformance test circuits $C_a$ and $C_b$ are determined as conformance in consonance with the definition in Table 1. In FIG. 8, therefore, a selector 66 switches to input 1 in order to select the output from the AND gate 65, and when the outputs of both the conformance test circuits $C_a$ and $C_b$ are "1," the selector 66 outputs "1."

Referring back to FIG. 5, for the separate UPC for an OAM cell, the AND gate 58 excludes (output of $C_{OAM}$).

Further, as is shown in FIG. 6, the flag SP set in the second RAM 55 is (SP=1), the output is regarded as being used for an independent separate UPC relative to an OAM cell flow. For connection data for setting SP=1, C01, C02, C11 and C12 are so set that the output of the conformance test circuit $C_b$ is not used for the UPC of a subscriber data cell. More specifically, (C02, C01)=(C12, C11)=(0, 1).

When an input cell is an OAM cell, the cell identifier 51 transmits OAM=1 to one of the input terminals of the AND gate 57. In addition, when the SP of the connection data that is stored in the second RAM 55 is SP=1, the determination of conformance performed by the OAM discriminator $C_{OAM}$ is selected by a second selector 59 via the second AND gate 57, instead of the determination of conformance for a subscriber data cell.

Since the second selector 59 is provided, no special logic is required for the OAM discriminator $C_{OAM}$. The cell for which a delay is adjusted by a cell buffer 52 is abandoned by a cell processor 53, or tagging of the cell is performed, in consonance with the result of determination.

When the cell flow is determined to be conformance, including the performance of tagging process, the UPC parameters must be updated. In FIG. 5, the TAT that is used by the conformance test circuits $C_a$ and $C_b$ is data to be updated.

Although a specific structure for data updating is not shown in FIG. 5, during the previously mentioned process in FIG. 7, a TAT to be updated is determined by referring to Table 2, and the contents of the first RAM 54 in FIG. 5 are updated. It should be noted that the TAT to be updated is determined according to the condition described in the left column in Table 2.

TABLE 2

| | Condition | | | | | | |
|---|---|---|---|---|---|---|---|
| Input cell | CLP value | C02 | C01 | C12 | C11 | SP | TAT to be updated |
| User data or OAM at SP = 0 | 0 | 0 | 0 | D.C. | D.C. | D.C. | None |
| | | 0 | 1 | | | | TAT used by $C_a$ |
| | | 1 | 0 | | | | TAT used by $C_b$ |
| | | 1 | 1 | | | | TAT used by $C_a$, $C_b$ |
| | 1 or Tagging = 1 | D.C. | D.C. | 0 | 0 | | None |
| | | | | 0 | 1 | | TAT used by $C_a$ |
| | | | | 1 | 0 | | TAT used by $C_b$ |
| | | | | 1 | 1 | | TAT used by $C_a$, $C_b$ |
| OAM Cell | D.C. | D.C. | D.C. | D.C. | D.C. | 1 | TAT used by $C_b$ |

Table 3 shows an example of a routing (determination reference) information table for each of the CLPs for connection data that are stored in the second RAM 55 in FIG. 6. Based on the definition in Table 1, an explanation will be given for the contents of the second RAM 55, which is a specific application example for FIG. 5.

TABLE 3

| | Definitions of contents in RAM 55 | | | | |
|---|---|---|---|---|---|
| | Setup for CLP = 0 | | Setup for CLP = 1 | | |
| | C02 | C01 | C12 | C11 | Remarks |
| (a) | 1 | 1 | 0 | 1 | PCR(0 + 1), PCR(0) |
| (b) | 0 | 1 | 0 | 0 | PCR(0) |
| (c) | 1 | 1 | 0 | 1 | PCR(0 + 1), SCR(0) |
| (d) | 0 | 1 | 0 | 1 | PCR(0 + 1) |
| (e) | 1 | 1 | 0 | 0 | PCR(0), SCR(0) |

Assume that the UPC mode for a specific connection with the interface specifies a peak cell rate relative to the flow of cells for which CLP=0 [expressed as PCR (0)] and also specifies a peak cell rate regardless of the CLP value expressed as PCR (0+1).

In this case, the connection data is set as (a) in Table 3 in accordance with the definition in Table 1. This means that a cell for which CLP=0 is determined to be a conformance cell by both of the conformance test circuits $C_a$ and $C_b$, and a cell for which CLP=1, or a cell for which a tagging option is performed, is determined to be a conformance cell by the conformance test circuit $C_a$.

When the tagging option is set and an input cell is CLP=0, and when the inflow of cells for which CLP=0 is inhibited (determined as non-conformance cells by the conformance test circuit $C_b$), the CLP value is changed from 0 to 1, so that the inflow of the cells is permitted.

Similarly, when only PCR (0) is specified for another connection and when the inflow of cells for which CLP=1 is inhibited, this case corresponds to (b) in Table 3. More specifically, although the cell for which CLP=0 is examined by the conformance test circuit $C_a$, the cell for which CLP=1 is set to (C12, C11)=(0, 0), so that, as is defined in Table 1, the cell for which CLP=1 is determined to be a non-conformance cell, regardless of the results obtained by the conformance test circuits $C_a$ and $C_b$.

When PCR (0+1) and SCR (0) are set for another connection, this situation corresponds to (c) in Table 3.

The SCR (Sustainable Cell Rate) is an averaged cell rate. The algorithms for the SCR and the PCR do not have to be changed when the virtual scheduling algorithm or the leaky bucket algorithm are employed as test components. Thus, the setting for the connection (c) is the same as for (a).

The cell for which CLP=0 is examined by both the conformance test circuits $C_a$ and $C_b$, while the cell for which CLP=1 is examined by the conformance test circuit $C_a$. In other words, the conformance test circuit $C_a$ checks CLP= 0+1, and the conformance test circuit $C_b$ checks CLP=0.

That is, PCR (0+1) is examined by the conformance test circuit $C_a$, and SCR (0) is examined by the conformance test circuit $C_b$. PCR (0+1) is set to (d) in Table 2 and PCR (0) and SCR (0) are set to (e) in Table 2.

As is in the above description of the embodiments, according to the present invention, various UPC (Usage Parameter Control) modes that use the same hardware structure can be provided for an ATM switching device.

Further, since a control table for each connection is prepared in a RAM, the UPC mode can be easily changed for each connection. Therefore, even when there are three or more conformance test components, only a simple structure is required to add them.

What is claimed is:

1. A method for controlling an input rate of asynchronous transfer mode cells by conforming the asynchronous transfer mode cells, comprising the steps of:

storing routing information in a table, indicating conformance tests which are performed for each of connections, according to the value "1" or "0" of a cell loss priority provided in each of the asynchronous transfer mode cells; and performing the conformance tests stored in the table, as corresponding to the value of the cell loss priority of each input asynchronous transfer mode cell for each of connections.

2. The method according to claim 1, wherein the routing information indicates same conformance tests for both the values "1" and "0" of the cell loss priority; and conformance tests of peak cell rate(PCR) and sustainable cell rate(SCR) are performed regardless of the value of the cell loss priority of the input asynchronous transfer mode cell.

3. The method according to claim 1, wherein the conformance tests stored in the table include non-conformance, thereby to conduct a non-conformance process or a tagging process for each value of the cell loss priority.

4. A method for controlling an input rate of asynchronous transfer mode cells by conforming the asynchronous transfer mode cells, comprising the steps of:

storing routing information in a table, indicating conformance tests which are performed for each of connections according to the value "1" or "0" of a cell loss priority provided in each of the asynchronous transfer mode cells;

performing plural conformance tests indicated by the routing information for an input asynchronous transfer mode cell regardless of the cell loss priority value of the input asynchronous transfer mode cell; and determining conformance for the cell loss priority value "1" or "0" of the input asynchronous transfer mode cell based on each result of the performed plural conformance tests and the routing information stored in the table corresponding to the cell loss priority value.

5. The method according to claim 4, further comprising the step of conducting a tagging process, when result of the determination that is made when the cell loss priority value is "0" is non-conformance, and when result of the determination that is made when the cell loss priority value is "1" is conformance.

6. The method according to claim 4, further comprising the step of:

selecting a parameter to be updated in accordance with the routing information indicating conformance tests in the first table.

7. The method according to claim 4, further comprising the steps of:

storing routing information indicating plural conformance tests for an OAM cell in a second table, which is independently provided from the first table; and when the second table is enabled, employing one of the plural conformance tests for an OAM cell for a separate usage parameter control(TJPC).

8. The method according to claim 4, further comprising the steps of:

when an input cell is an OAM cell and the separate usage parameter control is set, updating a parameter for a conformance test that is used in common with the OAM cell; and when an input cell is a user data cell, referring to the first table, and selecting a parameter to be updated in accordance with the routing information indicating conformance tests in the first table.

9. An apparatus for controlling an input rate of asynchronous transfer mode cells by conforming the asynchronous transfer mode cells, comprising:

a table storing routing information, indicating conformance tests which are performed for each of connections, according to the value "1" or "0" of a cell loss priority provided in each of the asynchronous transfer mode cells; and means for performing the conformance tests stored in the table, as corresponding to the value of the cell loss priority of each input asynchronous transfer mode cell for each of connections.

10. The apparatus according to claim 9, wherein said stored routing information indicates same conformance tests for both the values "1" and "0" of the cell loss priority; and conformance tests of peak cell rate(PCR) and sustainable cell rate(SCR) are performed regardless of the value of the cell loss priority of the input asynchronous transfer mode cell.

11. The apparatus according to claim 9, wherein the conformance tests stored in the table include non-conformance, thereby to conduct a non-conformance process or a tagging process for each value of the cell loss priority.

12. An apparatus for controlling an input rate of asynchronous transfer mode cells by conforming the asynchronous transfer mode cells, comprising:

a table storing routing information in a table indicating conformance tests which are performed for each of connections, according to the value "1" or "0" of a cell loss priority provided in each of the input asynchronous transfer mode cells; and means for performing plural conformance tests for an input asynchronous transfer mode cell regardless of the cell loss priority value of the input asynchronous transfer mode cell; and means for determining conformance for each of the performed plural conformance tests according to the cell loss priority value "1" or "0" of the input asynchronous transfer mode cell and the routing information stored in the first table corresponding to the cell loss priority value.

13. The apparatus according to claim 12, further comprising:

means for conducting a tagging process, a result of the determination that is made is non-conformance when the cell loss priority value is "0", and the result of the determination that is made is conformance when the cell loss priority value is "1".

14. The apparatus according to claim 12, further comprising:

means for selecting a parameter to be updated in accordance with the routing information indicating conformance tests in the first table.

15. The apparatus according to claim 12, wherein said stored routing information indicates plural conformance tests for an OAM cell in a second table, which is independently provided from the first table; and when the second table is enabled, one of the plural conformance tests is employed for an OAM cell for a separate usage parameter control(TJPC).

16. The apparatus according to claim 12, wherein when an input cell is an OAM cell and the separate usage parameter control is set, a parameter is updated for a conformance test that is used in common with the OAM cell; and when an input cell is a user data cell the first table is referred to, and a parameter is updated in accordance with the routing information indicating conformance tests in the first table.

* * * * *